United States Patent [19]

Ohlberg et al.

[11] 3,833,388

[45] Sept. 3, 1974

[54] METHOD OF MANUFACTURING SHEET AND FLOAT GLASS AT HIGH PRODUCTION RATES

[75] Inventors: Stanley M. Ohlberg; James V. Jones, both of Pittsburgh, Pa.

[73] Assignee: PPG Industries Inc., Pittsburgh, Pa.

[22] Filed: Apr. 3, 1973

[21] Appl. No.: 347,510

Related U.S. Application Data

[63] Continuation-in-part of Ser. No. 275,127, July 26, 1972, abandoned.

[52] U.S. Cl.................. 106/52, 65/134, 106/DIG. 8
[51] Int. Cl............................................. C03b 1/00
[58] Field of Search........ 65/134, 135, 136; 106/52, 106/DIG. 8

[56] References Cited
UNITED STATES PATENTS

| | | | |
|---|---|---|---|
| 3,296,003 | 1/1967 | Swift et al.......................... | 65/134 X |
| 3,545,952 | 12/1970 | Conrad............................. | 65/134 X |
| 3,615,767 | 10/1971 | Conroy, Jr. et al............... | 65/134 X |

*Primary Examiner*—Arthur D. Kellogg
*Attorney, Agent, or Firm*—William J. Uhl

[57] ABSTRACT

A method of increasing the rate of production (throughput) of flat glass, particularly sheet glass manufactured by the Pittsburgh Process, and float glass manufactured by the Float Process is disclosed. The method involves altering the standard commercial sheet glass formulations of the Pittsburgh Process and of the Float Process to give a lower $SiO_2$ and CaO containing glass which has a higher $Na_2O$ content. The new glass composition melts and fines at lower temperatures and is a surprisingly more soluble composition for the batch sand which makes the glass composition faster melting. The new glass requires less salt cake for melting and fining than conventional sheet and float glass and also retains a higher percentage of $SO_3$ during melting and refining in the glass than either conventional sheet and float glass. These factors significantly reduce the pollution hazards associated with gaseous and particulate sulfur emissions. Further, since the glass is faster melting, it helps reduce particulate emissions due to dusting. Further, the new glass has a lower liquidus temperature, a wider working range, can be attenuated over a wider temperature range, and is easier to cut. Flat glass articles of the new composition can be both thermally and chemically tempered at faster rates. These improved properties all contribute to high throughput conditions. Although the new glass can be made at higher production rates, commercially desirable properties, such as chemical durability, are as good as commercially available sheet and float glass.

18 Claims, 7 Drawing Figures

3,833,388

METHOD OF MANUFACTURING SHEET AND FLOAT GLASS AT HIGH PRODUCTION RATES

CROSS REFERENCE TO RELATED APPLICATION

This application is a continuation-in-part of U.S. Pat. application Ser. No. 275,127, filed July 26, 1972 now abandoned.

BACKGROUND OF THE INVENTION

Field of the Invention: This invention is in the field of flat glass manufacturing. The invention relates to an improved method for the manufacture of sheet glass, particularly manufactured by the Pittsburgh Process, and for the manufacture of float glass by the Float Process. More particularly, the invention relates to the use of a new glass composition in the Pittsburgh and Float Processes, which results in higher yields of quality glass made at faster forming speeds.

The Pittsburgh Process for making sheet glass is well known in the art. The process basically involves vertically drawing a continuous flat glass sheet from an open bath of glass over a submerged clay draw bar. As the glass passes upwardly between rollers, it is annealed and at the end of the draw the glass is cut to size. Sheet glass is used principally as window glass. The composition for sheet glass made by the Pittsburgh Process has remained essentially unchanged for 25 years and is essentially as follows:

| Ingredient | Percent by Weight |
| --- | --- |
| $SiO_2$ | 73.09 |
| $Na_2O$ | 13.31 |
| CaO | 8.19 |
| MgO | 3.65 |
| $Al_2O_3$ | 1.22 |
| $Fe_2O_3$ | 0.12 |
| $K_2O$ | 0.24 |
| $SO_3$ | 0.22 |

A glass having the above composition is known as PENNVERNON glass.

Those skilled in the art have thought that this particular composition gave the best quality sheet glass coupled with the best manufacturing conditions in the Pittsburgh Process. Although sheet glass manufactured by the Pittsburgh Process, familiarly known under the trademark PENNVERNON glass, has been recognized for its excellent quality, it has been found in the practice of this invention that by altering the composition, sheet glass of comparable, or in certain instances, better quality can be made at significantly increased rates of production.

The Float Process for making flat glass is also well known in the art and is described in U.S. Pat. No. 3,083,551. Briefly, the process involves continuously forming the flat glass on a bath of molten tin. Since the glass is not touched by forming rolls, it has a brilliant fire polish and excellent optical clarity, making the glass useful for motor vehicle lights and large architectural applications where high optical quality is required. Manufacturing of flat glass by the Float Process became a commercial reality in the 1960's with approximately the following glass composition:

| Ingredient | Percent by Weight |
| --- | --- |
| $SiO_2$ | 73.22 |
| $Na_2O$ | 12.74 |
| $K_2O$ | 0.57 |
| CaO | 8.41 |
| MgO | 3.87 |
| $Al_2O_3$ | 1.03 |
| $SO_3$ | 0.18 |
| $Fe_2O_3$ | 0.10 |

Float forming is a very complex process where the properties of the glass must be compatible with the process, otherwise the quality and throughput of the glass could be severely affected. Therefore, once a composition is developed which gives good quality glass at reasonable throughputs, the composition is not tampered with. This partially explains why the above composition has remained essentially unchanged to date.

MOST PERTINENT PRIOR ART

The prior art has disclosed glass compositions which are similar to the ones proposed in this invention. However, these glass compositions of the prior art have not been recommended for use in either the Pittsburgh or the Float Process and differ either in the type and/or the proportion of components in the composition.

In a paper entitled "Suitable Glass Compositions for Different Methods of Mechanical Manipulation: Window Glass" by H. Cole reprinted in the *Journal of the Society of Glass Technology*, 37, 256–267 (1953), the following compositions are reported for use in manufacturing sheet glass by the Fourcault Process:

On page 261:

| Ingredient | Percent by Weight | | |
| --- | --- | --- | --- |
| $SiO_2$ | 73.8 | 73.2 | 73.35 |
| CaO + MgO | 11.1 | 10.55 | 11.05 |
| $Na_2O$ | 15.1 | 16.25 | 15.65 |

On page 262:

| Ingredient | Percent by Weight | |
| --- | --- | --- |
| $SiO_2$ | 74.0 | 72 |
| CaO + MgO | 10.5 | 13 |
| $Na_2O$ | 15.5 | 15 |

On page 266:

| Ingredient | Percent by Weight |
| --- | --- |
| $SiO_2$ | 72.0 – 72.5 |
| CaO | 8.2 – 9.0 |
| MgO | 4.0 – 3.2 |
| $R_2O_3$ | 0.5 – 1.0 |
| $Na_2O$ | 15.0 – 16.0 |

It should be noted that the glass compositions disclosed above in the Cole paper are recommended for use in the Fourcault Process and not for use in the Pittsburgh or Float Processes. In the same article, the glass compositions which are recommended for use in the Pittsburgh Process have lower soda contents and much higher CaO contents than the compositions taught in this invention. Typical glasses for the Pittsburgh Process are reported on pages 265 and 266 of the Cole article.

In *Glass Engineering Handbook* by E. B. Shand, Second Edition, McGraw-Hill (1958), the following compositions are reported.

On page 4, Table 1—1, glass compositions No. 3 and No. 6, respectively:

| Ingredient | Percent by Weight | |
|---|---|---|
| | No. 3 | No. 6 |
| $SiO_2$ | 71 – 73 | 73.6 |
| $Na_2O$ | 12 – 15 | 16 |
| $K_2O$ | — | 0.6 |
| CaO | 8 – 10 | 5.2 |
| MgO | 1.5 – 3.5 | 3.6 |
| $Al_2O_3$ | 0.5 – 1.5 | 1 |

Glass No. 3 is a composition for window glass manufacturing and Glass No. 6 is a composition for electric lamp bulbs.

Besides the above published prior art, applicants are aware of the following sheet glass compositions which are used commercially in the Fourcault Process in the United States:

| Ingredient | Percent by Weight | |
|---|---|---|
| $SiO_2$ | 71.82 | 72.43 |
| $Al_2O_3$ | 1.77 | 1.01 |
| $Fe_2O_3$ | 0.52 | 0.65 |
| $TiO_2$ | — | — |
| CaO | 6.93 | 8.38 |
| MgO | 4.01 | 2.38 |
| $Na_2O$ | 14.77 | 15.10 |
| $K_2O$ | 0.35 | 0.14 |
| $SO_3$ | 0.30 | 0.44 |

SUMMARY OF THE INVENTION

In accordance with this invention, there is provided an improved method of manufacturing flat glass by a sheet drawing or float process at higher throughputs and yields than normally associated with these processes, the improvement wherein the glass which is manufactured contains the following composition:

| Component | Percent by Weight on the Oxide Basis |
|---|---|
| $SiO_2$ | 70 –73.3 |
| $Na_2O$ | 15.5 –19.0 |
| CaO | 5.5 – 7.7 |
| MgO | 3.5 – 4.9 |
| $Al_2O_3$ | 0.1 – 1.5 |
| $Fe_2O_3$ | 0.03– 0.7 |
| $K_2O$ | 0.0 – 0.5 |
| $SO_3$ | 0.2 – 0.5 | wherein
a. the percentages of $SiO_2$, $Na_2O$, CaO, MgO, $Al_2O_3$ and $Fe_2O_3$ amount to at least 98 percent by weight of the total composition,
b. the CaO/MgO weight ratio is controlled within the range of 1.3 to 1.9, and the $Na_2O$/CaO weight ratio is controlled within the range of 2.0 to 3.2.

The invention also provides a flat glass article having the following composition:

| Component | Percent by Weight on the Oxide Basis |
|---|---|
| $SiO_2$ | 70 –7.3 |
| $Na_2O$ | 15.5 –19.0 |
| CaO | 5.5 – 7.7 |
| MgO | 3.5 – 4.9 |
| $Al_2O_3$ | 0.1 – 1.5 |
| $Fe_2O_3$ | 0.03– 0.7 |
| $K_2O$ | 0.0 – 0.5 |
| $SO_3$ | 0.2 – 0.5 | wherein
a. the percentages of $SiO_2$, $Na_2O$, CaO, MgO, $Al_2O_3$, $Fe_2O_3$ and $SO_3$ amount to at least 98 percent by weight of the total composition, and
b. the CaO/MgO weight ratio is within the range of 1.3 to 1.9 and the $Na_2O$/CaO weight ratio is within the range of 2.0 to 3.2.

The glass requires a reduced salt cake addition to the batch, i.e., less than 25 pounds of salt cake per 1,000 pounds of sand. In addition, at least about 60, and preferably at least about 80 percent of the $SO_3$ added to the glass in the form of salt cake, and optionally cullet, is retained in the glass.

DETAILED DESCRIPTION

The glass compositions and the resultant flat glass articles prepared therefrom can be produced from conventional glass-making materials properly compounded and thoroughly mixed so as to yield, when reacted, glasses of the desired composition. Suitable batch materials include glass sand, soda ash (sodium carbonate), caustic soda (sodium hydroxide), limestone (calcium carbonate), dolomite (calcium carbonate and magnesium carbonate), aluminum hydrate, feldspar (sodium potassium aluminum silicate), aplite (fine-grained light-colored granite consisting almost entirely of quartz and feldspar), nepheline syenite (mixture of several different sodium aluminum silicates and potassium aluminum silicates), rouge (iron oxide), salt cake (sodium sulfate), carbon and cullet (crushed glass).

The well-mixed batch ingredients are fed on a continuous basis to a tank furnace to be melted and refined. The batch ingredients can be fed to the furnace as loose batch or alternately they can be first pelletized on an inclined rotating disc pelletizer or the like using caustic soda as a binding agent and as a total or partial replacement for soda ash. The tank furnaces for the Pittsburgh and Float Processes are similar to most glass-making furnaces in that they are usually gas-fired and of the regenerative type well known in the art. In the Pittsburgh Process, the glass is drawn vertically upward between rollers from the surface of the bay or drawing kiln which is located at the working end of the tank. A clay draw bar of horizontal slab shape with a longitudinal rib on the top face is submerged several inches below the glass surface in the drawing kiln. The glass sheet is drawn from a glass surface immediately over the rib of the draw bar. The submerged draw bar serves to regulate glass temperature in the drawing kiln to control the convection flow of the glass and to assist in defining the line of generation of the sheet. A more detailed description may be found in *Glass Manual*, Pittsburgh Plate Glass Company, published in 1946.

The Float Process for the forming of flat glass consists of floating a ribbon or sheet upon the surface of a bath of molten metal, usually tin. The Float Process is as well known in the art as the Pittsburgh Process and an extended description here is unnecessary. The Float Process is fully described in U.S. Pat. No. 3,083,551 to Pilkington.

After the glass is properly melted, refined and formed as generally described above, it should have the following composition as determined by standard wet chemical and spectrophotometric analysis:

| Component | Percent by Weight | |
|---|---|---|
| | Preferred Range | Most Preferred Range |
| $SiO_2$ | 70 –73.3 | 71 –73.3 |
| $Na_2O$ | 15.5 –19.0 | 15.5 –16.5 |
| CaO | 5.7 – 7.7 | 5.5 – 7.5 |
| MgO | 3.5 – 4.9 | 3.5 – 4.5 |
| $Al_2O_3$ | 0.1 – 1.5 | 0.7 – 1.5 |
| $Fe_2O_3$ | 0.03– 0.7 | 0.05– 0.6 |
| $K_2O$ | 0.0 – 0.5 | 0.0 – 0.5 |
| $SO_3$ | 0.2 – 0.5 | 0.2 – 0.5 |

With regard to the individual components, the $SiO_2$ is the glass former and is needed to produce high temperature stability and chemical durability in the glass. Concentrations lower than the recommended amounts decrease the durability, and higher concentrations require higher melting temperatures and decreased melting rates and result in a decreased ability of the glass to retain $SO_3$.

Sodium oxide reduces the melting temperatures and provides a more soluble system for the silica. The higher the sodium oxide content in combination with reduced $SiO_2$ and CaO contents results in higher $SO_3$ retentions. However, $Na_2O$ concentrations higher than the recommended amounts decrease durability and prohibitively increase batch cost. Concentrations lower than the recommended amounts result in a decreased ability of the glass to retain $SO_3$ and also result in decreased melting rates and smaller working ranges.

CaO and MgO are employed as fluxes to decrease the melting temperature. Further, these constituents when used in the recommended proportions give a broad working range and low liquidus temperatures. In addition, the CaO provides for a more chemically durable glass and when used in lower than recommended concentrations, durability may be significantly affected. CaO concentrations higher than the recommended amount decrease the working range. With regards to the MgO content, higher than recommended concentrations can decrease the melting rate, working range and prohibitively increase the cost. Somewhat anomalously, concentrations of MgO lower than the recommended amount can also decrease the melting rate and working range. The ambiguous nature of MgO points to the importance of keeping the concentrations of the other principal components within the prescribed limits, so that the total concentration adds up to close to 100 percent. Besides the relative concentration of $Na_2O$, CaO and MgO, it is important that the weight ratios of $Na_2O/CaO$ and CaO/MgO be carefully controlled. Accordingly, the $Na_2O/CaO$ weight ratio should be controlled within the range of 2.0 to 3.2, and the CaO/MgO weight ratio should be controlled within the range of 1.3 to 1.9. Lower $Na_2O/CaO$ weight ratios result in a loss of chemical tempering propensity and a decreased ability of the glass to retain $SO_3$. Higher ratios decrease the durability of the glass. Higher than recommended CaO/MgO weight ratios decrease the ability of the glass to retain $SO_3$ and also decrease the working range of the glass, whereas lower ratios tend to decrease melting rates and chemical durability.

$Al_2O_3$ is present to regulate the viscosity of the glass, improve its durability and prevent devitrification of the glass. Concentrations lower than that recommended decrease the durability, whereas higher concentrations decrease the melting rate.

The $Fe_2O_3$ content in the glass can be due to the purposeful addition of rouge or can be due to an iron impurity in the limestone and dolomite materials. No matter what the source, its presence is important for commercial acceptance of the glass. The iron gives the glass a slight greenish-blue cast which has become associated with, and expected in, commercial flat glass. Thus, its concentration, even though present as an impurity, should be controlled within the prescribed limits. Higher concentrations decrease the light transmittance to an objectionable extent. Lower concentrations of $Fe_2O_3$ than recommended do not give the glass the desired cast and would indirectly greatly increase the batch cost by requiring refined stocks of dolomite and limestone.

$K_2O$ is present as an optional ingredient, being present essentially as an impurity from the aplite. However, the $K_2O$ is a good flux and probably lowers the melting temperature somewhat when present in the range specified. Concentrations higher than those set forth in the above range can adversely affect useful properties.

The $SO_3$ content is derived principally from the addition of salt cake ($Na_2SO_4$), which is an anti-scumming and fining agent. In the continuous melting and forming of glass in a commercial furnace, silica is the lightest of the batch ingredients and the slowest melting. The silica tends to migrate to the top of the melt and form a scum. It is important that this silica scum be solubilized by the melt as quickly as possible to avoid inhomogeneities in the resultant flat glass. For this purpose, sodium sulfate is added to the glass batch. The salt cake apparently helps to disperse the silica scum in the melt where it can be more readily solubilized. Somewhat surprisingly, with the glass compositions of this invention, less salt cake, generally about 50 percent less, is needed for adequate anti-scumming and fining than is needed with either commercial sheet or float glass compositions. In general, a salt cake addition of less than 25 pounds of salt cake per 1,000 pounds of sand is all that is required for adequate melting and fining. Comparatively, for a glass batch used to make PENNVERNON glass or conventional float glass, a salt cake addition of 35 pounds of salt cake per 1,000 pounds of sand is required for adequate melting and fining. In addition, the glass compositions of this invention retain at least about 60, and preferably greater than 80 percent of the $SO_3$ which is added to the glass batch in the form of salt cake or cullet in the flat glass, whereas currently known commercial sheet and float glass retain about 40 percent. These factors are important because there are numerous disadvantages to using salt cake. First of all, the salt cake decomposes, releasing corrosive and toxic $SO_3$ and $SO_2$ vapors which attack the refractories in the tank. Also, the $SO_2$ and $SO_3$ can recombine with $Na_2O$ to precipitate in the regenerative checker system of the furnace, plugging it up and corroding the checker brick. Further, particulate $Na_2SO_4$ dust and the $SO_2$ can be released to the atmosphere causing an air pollution hazard. Finally, the sodium sulfate is expensive and if less is used and the sodium content made up with cheaper sodium carbonate, an economical advantage is realized.

Conventional glass colorants such as selenium cobalt and nickel can optionally be present in the glasses in combination with iron in ratios such as are shown in U.S. Reissue Pat. No. 25,312 to Duncan et al. and U.S. Pat. No. 3,296,004 to Duncan.

EXAMPLES

Example I

Description of the Preferred Embodiment

To a commercial-size tank furnace capable of containing 700 or more tons of molten glass and which is used in conjunction with a drawing machine for the manufacture of sheet glass by the Pittsburgh Process, were added on a continuous basis the following well-mixed batch ingredients:

| Ingredients | Parts by Weight |
| --- | --- |
| Glass sand | 1000 |
| Soda ash | 367 |
| Limestone | 22.3 |
| Dolomite | 243.6 |
| Aplite | 67.6 |
| Rouge | 0.23 |
| Salt cake | 20.0 |
| Carbon | 0.70 |
| Cullet[1] | 1722.13 |

[1] The cullet had the following composition: 72.68% $SiO_2$, 15.58% $Na_2O$, 0.15% $K_2O$, 6.41% $CaO$, 3.65% $MgO$, 1.21% $Al_2O_3$, 0.24% $SO_3$ and 0.079% $Fe_2O_3$.

The glass batch was melted and fined at a temperature of about 2,800°F. (melting zone) to about 2,500°F. (fining zone). As the glass melted, it proceeded from the melting end of the tank through the fining zone to the working end where it flowed into three drawing kilns. From each drawing kiln a 98 inch width of glass sheet was continuously drawn upwardly between rollers from the glass surface immediately over a submerged draw bar as in accordance with the commercial practices of the Pittsburgh Process. The glass was drawn upwardly and vertically through a drawing machine to about 25 feet above the drawing kiln during which time the glass was annealed and then cut to size. On inspection and analysis, the actual composition of the flat sheet glass produced was determined by wet chemical analysis and X-ray fluorescence to be as follows:

| Component | Percent by Weight, Oxide Basis |
| --- | --- |
| $SiO_2$ | 72.68 |
| $Na_2O$ | 15.58 |
| $K_2O$ | 0.15 |
| $CaO$ | 6.41 |
| $MgO$ | 3.65 |
| $Al_2O_3$ | 1.21 |
| $SO_3$ | 0.24 |
| $Fe_2O_3$ | 0.079 |

The glass composition of Example I has the following high temperature viscosity properties as generally determined by the procedure described in "Measurements of Absolute Viscosity by the Use of Concentric Cylinder," H. R. Lillie, *J. Amer. Ceram. Soc.*, 12, No. 8, 505 (1929). See also U.S. Pat. No. 3,056,283 to Tiede. For the purpose of comparison, the high temperature viscosity properties of commercial sheet glass having the following composition: 73.09 percent $SiO_2$, 13.31 percent $Na_2O$, 0.24 percent $K_2O$, 8.19 percent $CaO$, 3.65 percent $MgO$, 1.22 percent $Al_2O_3$, 0.22 percent $SO_3$ and 0.12 percent $Fe_2O_3$, and commercial float glass having the following composition: 73.06 percent $SiO_2$, 13.64 percent $Na_2O$, 0.03 percent $K_2O$, 8.86 percent $CaO$, 3.86 percent $MgO$, 0.12 percent $Al_2O_3$, 0.30 percent $SO_3$, and 0.13 percent $Fe_2O_3$ are also given.

| Log of the Viscosity in Poises | Temperature °F. | | |
| --- | --- | --- | --- |
| | Glass of Example I | Commercial Sheet Glass | Commercial Float Glass |
| 2 | 2648 | 2705 | 2622 |
| 3 | 2175 | 2230 | 2169 |
| 4 | 1869 | 1920 | 1873 |
| 5 | 1653 | 1702 | 1666 |
| 6 | 1495 | 1540 | 1511 |
| 7.6 | 1312 | 1352 | 1333 |
| 13 | 985 | 1019 | 1017 |
| Liquidus Temperature °F. — Procedure described in J. Soc. Glass Techn., 24, 101–108 (1940) by E. Preston | 1690 | 1840 | 1830 |
| Working Range °F. | 179 | 80 | 43 |
| Annealing Point °F. as measured by A.S.T.M. C-336 | 985 | 1020 | 1015 |
| Strain Point °F. as measured by A.S.T.M. C-336 | 910 | 940 | 940 |
| Softening Point °F. as measured by A.S.T.M. C-338 | 1312 | 1348 | 1337 |

The glass of Example I, when made in commercial-sized quantities at 0.090 inch thicknesses, gave significantly higher throughputs than commercial sheet glass made in the same equipment. Accordingly, production figures for a 24-day period showed a throughput for the glass of Example I of 155 tons per day as compared to a throughput figure of 125 tons per day using the commercial sheet glass.

Higher throughput was reached even though the glass of Example I was melted over a lower temperature range in the melter than that used for the commercial sheet glass. In addition, tank temperatures in the refiner and drawing kilns were significantly lower for the glass of Example I, that is, about 2,500° F. in the refiner and 1,926° F. in the drawing kiln for the glass of Example I as compared to 2,550° F. in the refiner and 2,017° F. in the drawing kiln for the commercial sheet glass.

The buildup of devitrified products in the drawing kiln was appreciably less using the glass of Example I than that observed in using the commercial sheet glass composition, which necessitated the discontinuance of drawing after 800 hours and reheating the drawing kiln to remelt the devitrified products, resulting in a 12-hour loss of production. Using the glass of Example I, kiln cycles were 2 to 3 times longer.

The drawing machine speeds with the glass of Example I were about 95 inches per minute for a thickness of 0.090 inch as compared to a drawing speed of 77 inches per minute attained with the commercial sheet glass of the same thickness. In forming this glass, applicants discovered that it could be attenuated over a wider temperature interval than the usual sheet composition. This property is particularly useful for flat glass forming. Thus, when auxiliary coolers are added to the conventional set-up at locations further from the drawing bath, the drawing speed could be increased by 4 inches to 8 inches per minute for the glass of Example I, while the speed increase is only 2 inches to 4 inches for an equivalent set of conditions in the case of the conventional sheet composition. Applicants are not sure why the new compositions have this property, however, they believe the higher percent $Na_2O$ and higher $Na_2O/CaO$ ratio extend the temperature interval over which the transformation from a viscoelastic to an elastic state occurs.

Applicants fully expect that this property will be most useful in the production of thin float glass both with respect to increased forming speed and improved quality. The latter is true because the large temperature interval for the viscoelastic range means that the flow of the glass will be less sensitive to temperature fluctuations and thermal gradients. This in turn means less distortion and thickness variation in the finished ribbon.

Example II

In a laboratory simulation of the float process, glass of Example I was successfully processed on a molten tin bath in the same atmosphere and at the same temperatures as that used in a commercial installation. It was concluded that this composition would readily lend itself to the float process. The glass temperatures in the float bath would be lower than those for the current float composition. This would minimize undesirable tin pick-up and also minimize deterioration of the bath furniture.

Examples III – VI

Glasses having the following compositions can be prepared by the Pittsburgh and Float Processes and are illustrative of the invention.

| Component | Percent by Weight, on the Oxide Basis | | | |
|---|---|---|---|---|
| | III | IV | V | VI |
| $SiO_2$ | 72.40 | 72.24 | 71.25 | 71.14 |
| $Na_2O$ | 15.69 | 15.70 | 15.80 | 15.96 |
| $K_2O$ | 0.02 | 0.14 | 0.15 | 0.09 |
| $CaO$ | 6.36 | 6.51 | 7.10 | 7.48 |
| $MgO$ | 3.80 | 4.00 | 4.08 | 4.11 |
| $Al_2O_3$ | 1.26 | 1.00 | 1.03 | 0.78 |
| $SO_3$ | 0.30 | 0.36 | 0.38 | 0.39 |
| $Fe_2O_3$ | 0.12 | 0.14 | 0.13 | 0.06 |

The above compositions had the following high temperature-viscosity properties:

| Log of Viscosity in Poises | III | IV | V | VI |
|---|---|---|---|---|
| 2 | 2649 | 2615 | 2600 | 2560 |
| 3 | 2179 | 2158 | 2144 | 2098 |
| 4 | 1874 | 1861 | 1847 | 1817 |
| 5 | 1659 | 1653 | 1639 | 1610 |
| 6 | 1500 | 1499 | 1485 | |
| 7.6 | 1317 | 1321 | 1307 | |
| 13 | 993 | 1008 | 992 | |
| Liquidus Temperature °F. | 1695 | 1705 | 1690 | 1720 |
| Working Range °F. | 179 | 156 | 157 | 97 |
| Annealing Point °F. | 993 | 1008 | 992 | 990 |
| Softening Point °F. | 1317 | 1321 | 1307 | 1298 |

As the above working examples show, glass compositions within the scope of the invention have a combination of physical properties which coordinate with one another to result in a glass capable of being manufactured by the Pittsburgh or Float Processes at high throughput conditions in good yields with excellent quality.

The above working examples show that the glasses of the invention have excellent melting and forming properties. The glasses have low melting temperatures which are desirable for fuel economy, but more importantly, the lower the melting temperature, all things being equal, the faster the batch ingredients can liquify and begin to react. This is important because a glass batch which slowly liquifies creates more dust in the furnace which can increase stack emission and plug the regenerative checker system. The viscosity of the glass during melting should be low, on the order of 100 poises (log viscosity = 2) to get the glass well homogenized and seed-free. As the above examples show, the glasses of this invention have low melting temperature, i.e., within the range of 2,550°–2,660°F.; the melting temperature being defined as the glass temperature required to liquify the glass to a viscosity of 100 poises.

Other important melting and forming properties which play an important role in throughput and yield of a flat glass manufacturing operation are the liquidus temperature and the working range. The liquidus is defined as the temperature at which devitrification first appears. At temperatures slightly below the liquidus, devitrification occurs at a relatively rapid rate, and if uncontrolled, could ruin the flat glass sheet, severely curtailing production yields. Recently it has been found that devitrification occurs near the forming end of large float tanks at locations quiescent with respect to tank flows. When this devitrified material melts for one reason or another, it evolves gas bubbles which persist in the finished ribbon. Somewhat related to liquidus and the problem of devitrification is the working range of the glass. The working range is defined as the temperature interval between the sheet forming temperature (log viscosity = 4) and the liquidus temperature. In flat glass manufacturing, particularly sheet drawing processes, it is desirable to have a low liquidus temperature and a wide working range. A low liquidus temperature insures against a devitrification in cold spots of the furnace or drawing kiln. A wide working range is desirable because if the working range is too narrow, the forming temperature is close to the liquidus temperature and this means in various parts of the drawing kiln, the devitrified products will build up. Devitrified materials have many undesirable effects in reducing throughput and yield. For example, devitrified materials accumulate at the sides of the drawing kiln and give a resultant ribbon with thick edges which must be drawn at slower drawing speeds. Also, a ribbon with thick edges has a much higher propensity for breakage in the drawing machine. Moreover, when the devitrified products accumulate in the kiln, the drawing will have to be stopped and the kiln reheated to remelt the crystallized products. This can result in a 12-hour loss in production time and also severely affects the glass flow in other portions of the tank, resulting in an intial upset after the reheat of non-homogeneous glass. Accordingly, the glass compositions of this invention have been carefully formulated to have low liquidus temperatures, for example, from 1,680°–1,725°F., and wide working ranges, that is, on the order of 95°–195°F. In comparison, commercial sheet glass has a liquidus temperature of about 1,840°F. and a working range of 80°F. Commercial float glass has a liquidus temperature of about 1,835°F. and a working range of about 63°F. Devitrification at the interface between the tank and the tin bath has been a serious source of defects in the float process.

A glass having the composition of Example V is particularly desirable for float forming. The lower liquidus temperature and greater working range of this glass as compared to commercial float glass (liquidus temperatures of 1,690°F. versus 1,830°F. and working ranges of 157°F. versus 43°F.) provide a greater margin for avoiding devitrification problems. Since the glass of Example V is a lower melting glass than conventional float glass, the glass of Example V will enter the float bath at a lower temperature. This will result in a smaller glass temperature difference between bath entrance and exit and will allow higher throughputs for a given bath than that possible with conventional commercial float glass.

Figure 1:
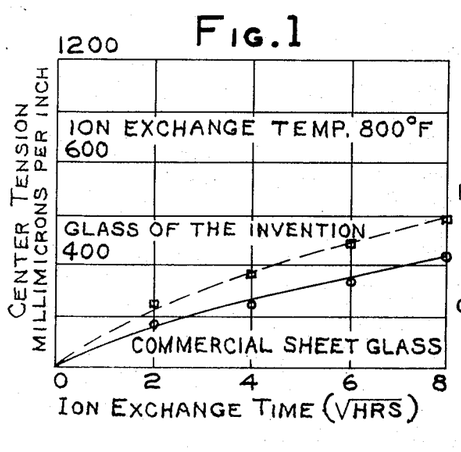
FIGS. 1 to 6 show the greater propensity for chemical tempering that the glasses of this invention have over commercial sheet glass.
Figure 2:
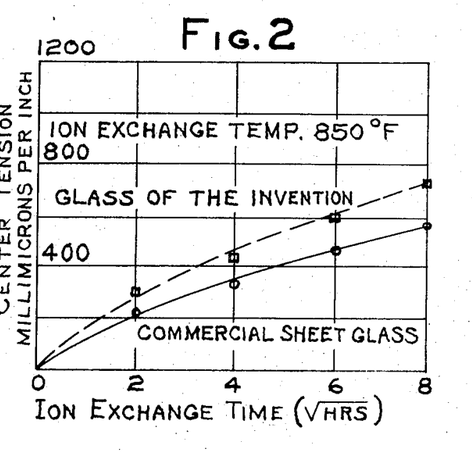
Figure 3:
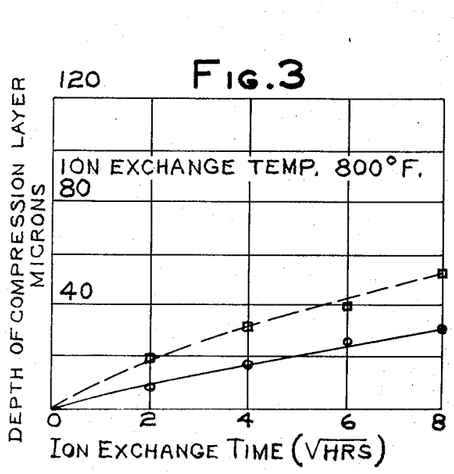
Figure 4:
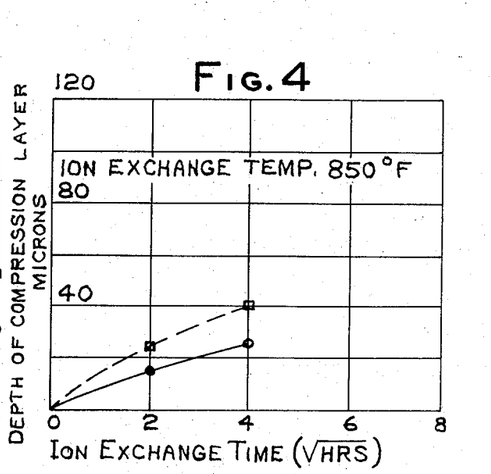
Figure 5:
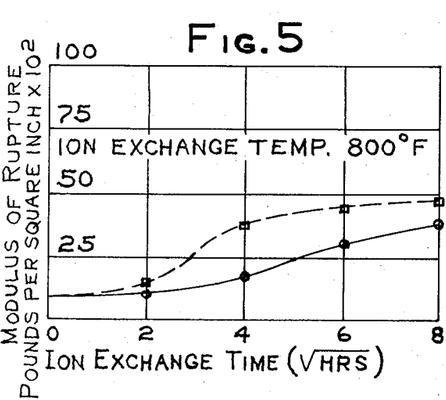
Figure 6:
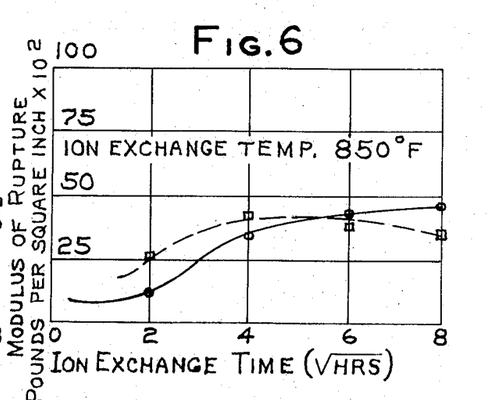
Figure 7:
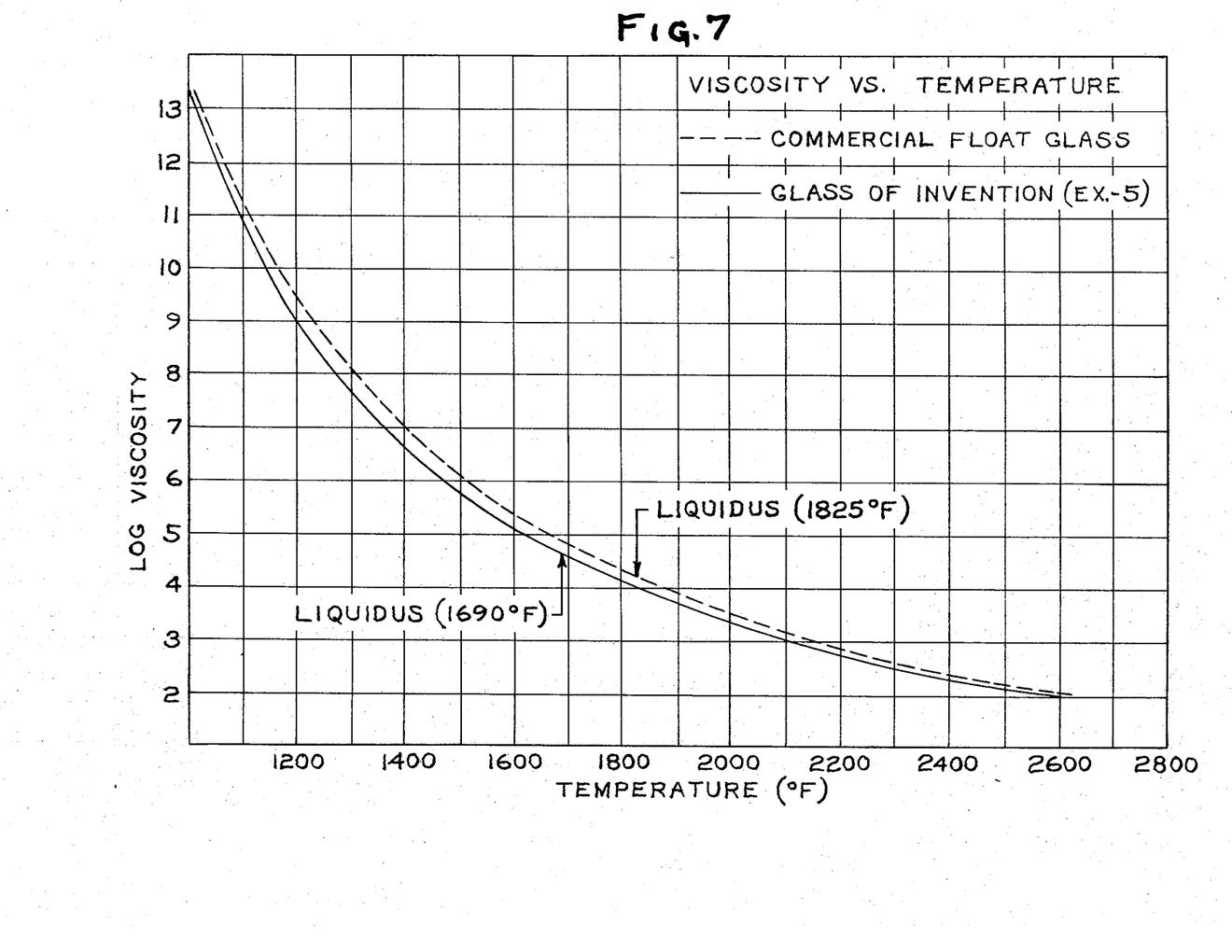
FIG. 7 is a plot of the log of the viscosity versus temperature for a glass of the invention and for conventional commercial float glass.

The viscosity versus temperature curve for the glass of Example V is slightly flatter than the curve for commercial float glass, see FIG. 7. The flatter the viscosity versus temperature curve, the better for float forming. A flatter viscosity versus temperature curve means that for a given temperature gradient across the width of glass ribbon, the viscosity differences across the ribbon will be smaller. The smaller viscosity gradients across the ribbon will be helpful in avoiding distortion problems in making of thin glass and will also help to avoid wedginess in the glass sheet.

The glass of Example V will be at lower operating temperatures throughout the bath, particularly in hotter parts of the bath (about 30°–50°F.) than conventional commercial float, and this will reduce the high temperature requirements for bath materials and components and permit the use of shorter float baths and/or higher throughputs.

sand in a particular glass melt can be determined by two techniques which are presented in the working examples below.

Examples VII – XVI

"Batch-free time" is defined as the time required to melt, at fixed conditions, sufficient amounts of batch to produce 100 grams of glass free from residual sand grains.

In the experiments reported below, batch-free times (B.F.T.) of glass batches used to prepare commercial sheet glass (Examples VI to IX) were compared with glass batches used to prepare glass compositions in accordance with this invention (Examples X to XV).

In conducting the experiments, 100 grams of batch were charged to platinum-rhodium crucibles and put in a Globar furnace operating at 2,380°F., then programmed at 3°F. per minute to 2,500°F. and held at this temperature for various lengths of time. The melting time is the interval between when the crucibles are set in the furnace at 2,380°F. to the time they are removed at 2,500°F. For these particular tests, crucibles were removed at ½ hour intervals.

The melted glass is examined at 30x magnification to determine the presence of residual sand grains. The ½ hour interval which no longer shows residual sand grains is taken as the B.F.T.

Because the percentage of salt cake, and the salt cake to coal ratios are rather freely manipulated in glass manufacturing for color, stone, etc. problems, batches were melted at both 15 and 30 pounds of salt cake per 1,000 pound sand levels, and at salt cake to coal ratios of 60 to 1 and 30 to 1.

The following tables report the batch weights and stone counts for the different glasses. The data shows that the glass compositions of this invention become batch-free quicker at both the 15 and 30 pound salt cake levels. The data shows that batches used to prepare glass compositions of this invention have an average batch-free time 15 to 30 percent lower than batches used to prepare commercial sheet glass formulations.

Table I

Batch Compositions

| | Commercial Sheet Glass Example | | | | Glass of the Invention Example | | | | | |
|---|---|---|---|---|---|---|---|---|---|---|
| | VII | VIII | IX | X | XI | XII | XIII | XIV | XV | XVI |
| Sand | 70.00 | 70.00 | 70.00 | 70.00 | 70.00 | 70.00 | 70.00 | 70.00 | 70.00 | 70.00 |
| Soda Ash | 21.63 | 20.86 | 21.63 | 20.86 | 25.60 | 24.85 | 25.76 | 24.99 | 25.76 | 24.99 |
| Dolomite | 16.03 | 16.03 | 16.03 | 16.03 | 18.20 | 18.20 | 17.85 | 17.85 | 17.85 | 17.85 |
| Aplite | 4.99 | 4.99 | 4.99 | 4.99 | 4.55 | 4.55 | 5.15 | 5.15 | 5.15 | 5.15 |
| Limestone | 5.39 | 5.39 | 5.39 | 5.39 | 0.189 | 0.189 | 1.33 | 1.33 | 1.33 | 1.33 |
| Salt Cake (S.C.) | 1.05 | 2.10 | 1.05 | 2.10 | 1.05 | 2.10 | 1.05 | 2.10 | 1.05 | 2.10 |
| Coal | 0.0175 | 0.07 | 0.035 | 0.035 | 0.0175 | 0.07 | 0.0175 | 0.07 | 0.035 | 0.035 |
| Rouge | 0.056 | 0.056 | 0.056 | 0.056 | 0.056 | 0.056 | 0.056 | 0.056 | 0.056 | 0.056 |
| S.C./Sand | 15/1000 | 30/1000 | 15/1000 | 30/1000 | 15/1000 | 30/1000 | 15/1000 | 30/1000 | 15/1000 | 30/1000 |
| S.C./Coal | 60/1 | 30/1 | 30/1 | 60/1 | 60/1 | 30/1 | 60/1 | 30/1 | 30/1 | 60/1 |

A fourth melting and forming property related to melting temperature but which is considered to be more important than melting temperature as far as throughput is concerned, is the solubility of the batch sand or silica in the melt. In the glass-making process, the sand is not melted, it is dissolved. The faster the sand goes into solution at the melting temperature, the faster the glass can be homogenized, refined and shaped into flat glass form. The solubility of the batch Table II Residual Sand Grains and Batch-Free Times

| | Example | | Example | |
|---|---|---|---|---|
| Hours | VII | IX | X | VIII |
| 2 | Not Determined (N.D.) | N.D. | N.D. | N.D. |

Table II-Continued

Residual Sand Grains and Batch-Free Times

| Hours | Example VII | Example IX | | Example X | Example VIII |
|---|---|---|---|---|---|
| 2½ | 249 | 1 | | 666 | 884 |
| 3 | 1 | Batch-Free (B.F.) | | 3 | 37 |
| 3½ | B.F. | B.F. | Avg. 3.25 hrs. | B.F. | 1 |
| 4 | B.F. | B.F. | | B.F. | B.F. |

| Hours | Example XIII | Example XV | | Example XVI | Example XIV |
|---|---|---|---|---|---|
| 1½ | N.D. | 2580 | | 197 | 1400 |
| 2 | 19 | 5 | Avg. 2.25 hrs. | 1 | 9 |
| 2½ | B.F. | B.F. | | B.F. | 1 |
| 3 | B.F. | B.F. | | B.F. | B.F. |
| 3½ | B.F. | N.D. | | N.D. | N.D. |

| Hours | Example XI | | Example XII |
|---|---|---|---|
| 2 | N.D. | | N.D. |
| 2½ | 8 | Avg. 2.75 hrs. | 28 |
| 3 | B.F. | | 3 |
| 3½ | N.D. | | B.F. |

In summary, it can be seen from the above experiments that the batch-free times for the glass compositions of this invention are some 15 to 30 percent lower than commercial sheet glass. Accordingly, the batch-free times for the glass compositions of the invention are usually no higher than 2.75 hours and are preferably lower, whereas commercial sheet glass compositions have batch-free times on the order of 3.25 hours. In an identical set of experiments, it was found that the batch-free time for a commercial float glass ranged from 3½ to 4 hours.

Example XVII

This example presents a second method to determine silica solubility. In the experiment, three glass compositions, one composition being of the invention, while the other two were a commercial sheet and a commercial float glass formulation, were heated separately to a temperature of 2,525°F. in a microfurnace (Micro-Bar manufactured by the Abar Corporation of Feasterville, Pa.). A single grain of sand was placed in the middle of the molten glass pool and using a micrometer eyepiece, the rate of solution was observed. In every case spherical grains of sand of equal diameter were selected by examination under a stereo microscope. The results for the experiments are shown in Table III below.

It is seen that the sand grain dissolved faster in the glass of the invention than in the two commercial compositions. The log of the viscosity in poises for each of these three compositions at this temperature is as follows: commercial sheet, 2.32; commercial float, 2.18; glass of the invention, 2.23. It is to be noted that the sand grain even dissolves faster in the glass of the invention than in commercial float despite the fact that the latter is less viscous at this temperature. Accordingly, the glass compositions of this invention show a surprising solubility for silica, such that when the composition is melted as described above, it will reduce the diameter of a sand grain from 600 microns to less than 350 microns in one hour.

After the glass has been melted, fined and formed, it is continuously annealed and then cut to size. Cutting ease, although difficult to describe, is nevertheless very meaningful because it can significantly reduce cutting losses and thereby increase the yield of glass obtained. Cutting ease of the glass is believed to be related to the elastic properties of the glass, such as Young's Modulus and Poisson's Ratio. It has been found that the glass compositions of this invention have been carefully tailored to give low values for the Young's Modulus and Poisson's Ratio, that is, below $10 \times 10^6$ pounds per square inch (psi) for the Young's Modulus and below 0.25 for Poisson's Ratio. Commercial float glass, on the other hand, was found to have a Young's Modulus of $10.03 \times 10^6$ psi and a Poisson's Ratio of 0.254. Thus, since the glasses of this invention have such beneficial elastic properties, they are much easier to cut than comparable commercial float or sheet glass.

The reduced values for Young's Modulus and Poisson's Ratio are particularly beneficial in the float forming process. These properties become important at the lift-off between the tin bath and the annealing lehr. Here the ribbon must be stiff enough not to distort but elastic enough not to break. The lower values for the elastic constants, while not affecting distortion, will decrease breakage.

Besides relating to cutting ease, the elastic properties of the glass are an important factor in determining the thermal stress in the glass, whether it relates to preheating, annealing, tempering, thermal endurance or fusing of glass to glass or metal. Normally, one thinks that with regards to thermal stress, the larger the linear coefficient of thermal expansion, the greater the stress buildup. Although this is generally true, it is superficial and does not take into consideration the effect the elastic properties of the glass have on thermal stress. Thus, although the glasses of this invention have higher linear coefficients of thermal expansion than commercially available sheet or float glass, the glasses of this invention have such enhanced elastic properties that the po-

Table III

Rate of Solution of Sand Grain in Molten Glass at 2525°F.

| Elapsed Time (minutes) | Sand Grain Diameter Commercial Sheet Glass[1] (microns) | Sand Grain Diameter Commercial Float Glass Composition[2] (microns) | Sand Grain Diameter Glass Composition of the Invention Example I (microns) |
|---|---|---|---|
| 0 | 600 | 600 | 600 |
| 15 | 552 | 510 | 492 |
| 30 | 486 | 462 | 432 |
| 45 | 450 | 426 | 390 |
| 60 | 438 | 396 | 348 |

[1] $SiO_2$, 73.09%; $Na_2O$, 13.31%; $K_2O$, 0.24%; CaO, 8.19%; MgO, 3.65%; $Al_2O_3$, 1.22%; $SO_3$, 0.22%; $Fe_2O_3$, 0.12%.
[2] $SiO_2$, 73.06%; $Na_2O$, 13.64%; $K_2O$, 0.03%; CaO, 8.86%; MgO, 3.86%; $Al_2O_3$, 0.12%; $SO_3$, 0.30%; $Fe_2O_3$, 0.13%.

tential for thermal stress development in the glass of this invention is about the same as it is for commercially available sheet and float glass formulations. For example, the elastic properties and linear coefficients of thermal expansion of a typical sheet glass sample prepared in accordance with the invention and a commercially available float glass sample are presented below.

| Property | Glass of Example I | Commercially Available Float Glass |
|---|---|---|
| Young's Modulus (E) | $9.62 \times 10^6$ psi | $10.03 \times 10^6$ psi |
| Poisson's Ratio ($\mu$) | 0.244 | 0.254 |
| Linear Coefficient of Thermal Expansion ($\alpha$) | $9.2 \times 10^{-6}/°C.$ | $8.5 \times 10^{-6}/°C.$ |

The thermal stress in glass will be proportional to the product of the Young's Modulus and the thermal expansion coefficient divided by 1 minus Poisson's Ratio.

Thermal Stress $\alpha\ [(E)\ \alpha/1 - \mu]$

Thus, in the above examples, the potential for thermal stress for the glass of this invention is 114 pounds per square inch/°C. (psi/°C.), whereas for commercial float glass, it is 117 psi/°C. It can be seen that other things being equivalent, there is little difference between the two compositions with respect to the generation of thermal stress. This is an important and advantageous finding as far as commercial production standards are concerned. This finding indicates that commercially available preheating, annealing, tempering and welding equipment can be used. Moreover, since the glass of this invention will have approximately the same thermal endurance as commercially available float and sheet glass, it can be used in the same applications with no greater risk of thermal breakage than is now present with commercially available sheet and float glass. Also, the glass has been found to be suitable for use in the production of welded double glazed units, such as described in U.S. Pat. Nos. 2,624,979 to Clever et al. and 2,894,294 to Prescott. In fact, welding times for double glazed units (22 × 18 inches) prepared with glass prepared according to Example I had weld times varying from 27 to 30 seconds while weld times for conventional sheet glass made by the Pittsburgh Process took from 35 to 37 seconds. The faster weld times resulted in a 7 percent increase in throughput in the production of welded double glazed units.

Although the glasses of the invention as mentioned above have about the same potential for developing thermal stress as do commercially available glasses, the glasses of the invention have been found to thermally temper quicker and at a lower temperature than commercially available sheet glass.

Example XVIII

To establish the performance of the glass of this invention for propensity for thermal tempering, a series of tempering trials were conducted using conventional gas hearth tempering methods as described in U.S. Pat. Nos. 3,223,501, 3,481,724 and 3,409,422.

In the first of three tests, 670 pieces of flat glass sheet having the composition of Example I and drawn to a thickness of ⅛ inch by the Pittsburgh Process were cut to a size of 28 inches by 30 inches. A second sample of 700 pieces having the same characteristics as those described above for the first test except being of different dimensions, having dimensions of 31¼ inches by 28⅞ inches were made ready for the tempering operation.

A conventional gas hearth tempering facility was heated to a temperature to receive the glass. The furnace had an overall heated length of about 66 feet, a preheat zone having radiant electric heaters and a glass supporting roller conveyor of 30 feet and a gas hearth having a gas support bed and disk drive of 36 feet. Top and bottom quench air can be supplied following the furnace exit with an adjustable gap between the top and bottom blowers. The gap is set at about 0.24 inch.

In the first test, the 28 inch by 30 inch by ⅛ inch glass sheet are processed at a throughput rate of 272 inches per minute with an elapsed time of about 6 seconds between pieces of glass. Plenum air pressure is adjusted to about 38 ounces per square inch top pressure and about 42 ounces per square inch bottom pressure. At the completion of the tempering run, the ultimate temper was deemed to be satisfactory. Glass sheets from the beginning, middle and end of the run are edged, taped and broken. Particle size was small indicating complete tempering. Losses in the furnace were about 1.9 percent comparable to that for tempering of commercially available sheet glass. In fact, when the commercially available sheet glass was tempered in the same gas hearth furnace, the throughput rate was only about 235 inches per minute to achieve the same degree of temper, thus indicating that by using the glass composition of this invention as shown by Example I, a greater than 15 percent increase in throughput could be achieved.

In the second test with the 31¼ inch by 28⅞ inch by ⅛ inch flat glass sheets, the line speed of the furnace was maintained at about 260 inches per minute and a full temper attained. In point of comparison when commercial sheet glass of this size is tempered in the same gas hearth furnace, a line speed of only 235 inches per minute could be used to achieve the same degree of temper, thus indicating an 11 percent increase in throughput using the glass of this invention as shown by Example I.

A third tempering test was conducted at a different gas hearth facility. In this test, 1,292 pieces of sheet glass having the composition of Example I and having the dimensions of 36 inches by 76 inches by 3/16 inch and prepared by the Pittsburgh Process were made ready for testing. The gas hearth tempering furnace had an overall heated length of 56 feet; a preheat zone having radiant electric heaters and a glass supporting roller conveyor of 28 feet; and a gas hearth having a gas support bed and disk drive of 28 feet. Top and bottom quench air can be supplied following the furnace exit with an adjustable gap between the top and bottom rollers. The gap was set at about 0.186 inch.

In the third test, the glass pieces were processed at a throughput rate of 285 inches per minute with an elapsed time of about 17.6 seconds between pieces of glass. Plenum air pressure is adjusted to about 24 ounces per square inch top pressure and about 20 ounces per square inch bottom pressure. Ultimate temper was deemed to be satisfactory as determined by edge taping and breaking glass sheets from the beginning, middle and end of the run. When comparable commercial sheet glass specimens were processed on the same facility, the throughput rate was only 260 inches per minute to achieve the same degree of temper, thus indicating about a 7 percent increase in throughput rate using the glass of this invention.

Somewhat analogous to thermal tempering is chemical tempering which is accomplished by immersing the flat glass sample in a molten potassium nitrate bath and ion exchanging the sodium ions in the surface of the glass with the potassium ions in the bath. Since the potassium ions are so much larger than the sodium ions, the exchange induces a compressive stress in the surface of the glass and a tensile stress in the interior regions of the glass. As the following Example shows, the glasses of this invention ion exchange at faster rates than commercially available sheet glass. Further, at low ion-exchange temperatures, the glasses of the invention develop a much greater center tension, surface compressive stress and compression depth than does commercial sheet glass.

Example XIX

In these experiments presented, a flat sheet glass sample prepared in accordance with this invention and having a composition as reported in Example I above was compared for chemical tempering propensity with a commercial sheet glass sample having the following composition: 73.09 percent $SiO_2$, 13.31 percent $Na_2O$, 8.19 percent $CaO$, 3.65 percent $MgO$, 1.22 percent $Al_2O_3$, 0.12 percent $Fe_2O_3$, 0.24 percent $K_2O$ and 0.22 percent $SO_3$.

The experiments were conducted by completely immersing 2 inches by 2 inches by 0.090 inch glass samples in a molten potassium nitrate bath at both 800°F. and 850°F. for periods of time ranging from 4 to 64 hours. Ion-exchange rates were measured by the quartz wedge technique as described in U.S. Pat. No. 2,460,515. Stress development was evaluated through center tension readings using the quartz wedge technique mentioned above and surface compression using the concentric ring test to determine the modulus of rupture. The concentric ring test is conducted on the 4 square inch sample. The larger circular ring has an internal diameter of 2 inches, whereas the smaller circular ring has an internal diameter of 1 inch. Both concentric rings have knife edges which contact the glass surface in a direction normal to the 4-inch area thereof. The load speed is 0.02 inch per minute, and the reported load strength is the average load strength (pounds per square inch) at which failure (glass breakage) occurs for the tested samples. The load strength in pounds per square inch is arrived at by multiplying the actual load strength pounds by the stress conversion factor which applies to 0.090 inch thick sheet glass.

When evaluating the modulus of rupture of a sample of glass specimens, wide divergence of experimental results is common if the specimens are tested without an effort to make uniform their surface characteristics. This is due in all likelihood to small surface defects, such as small cracks, not uniformly found in each specimen. In order to confidently evaluate a strengthening process or a particular glass for strength, it is desirable to evaluate a sample of abraded glass. By uniformly abrading specimens of strengthened glass, similar glasses, similarly treated, yield nearly reproducible test results and testing confidence is improved. Nordberg et al. in the *J. Am. Ceram. Soc.*, 47, 215–219 (1964) describes an abrading technique. Thus, where the modulus or rupture has been determined for glass samples, the abraded value is meant.

The particular experiments conducted and the results derived therefrom are shown in tabular form below and also are shown graphically in FIGS. 1 to 6.

Table IV

Comparison of Stress Developed in Glass of Example I and Commercial Sheet by Ion Exchange at 800°F. and 850°F.

| Ion Exchange Time in Hours | Center Tension millimicrons per inch | | Thickness of Compressive Layer—microns | | Modulus of Rupture (abraded) pounds per square inch | |
|---|---|---|---|---|---|---|
| at 800°F. | Example I | Comm. Sheet | Example I | Comm. Sheet | Example I | Comm. Sheet |
| 4 | 233 | 166 | 19 | 10 | 12,882 | 11,990 |
| 16 | 355 | 260 | 30 | 18 | 36,997 | 17,016 |
| 36 | 464 | 344 | 38 | 25 | 43,753 | 29,079 |
| 64 | 568 | 422 | 53 | 32 | 46,753 | 38,794 |
| at 850°F. | | | | | | |
| 4 | 283 | 213 | 24 | 15 | 27,058 | 13,007 |
| 16 | 423 | 330 | 40 | 26 | 40,861 | 32,543 |
| 36 | 589 | 453 | 52 | 39 | 39,296 | 42,157 |
| 64 | 720 | 561 | 63 | 50 | 36,105 | 45,443 |

The above experimental results show the superiority of glass compositions of this invention over a commercial sheet glass. The rate of ion exchange as determined by measuring the change in thickness of the compressive layer as a function of time shows an advantage in exchange rates of close to 2 to 1. Moreover, center tension stress development is higher by about 35 percent for all samples tested, and when the ion exchange is conducted at 800°F., the modulus of rupture is consistently and significantly higher at every exchange time. When the ion exchange is conducted at 850°F., the results for the abraded modulus of rupture at exchange times of 36 and 64 hours indicate higher strength readings for the commercial sheet glass sample. These results are explainable, however, when it is realized that ion exchanging is conducted at a temperature well below the strain point of the glass sample, so that the developing stresses will not relieve themselves through visco-elastic flow. The glass compositions of this invention have lower strain points than commercial sheet glass formulations and as a result, as the temperature of ion exchanging increases, the strain point of the glasses of this invention will be more closely approached than commercial sheet glasses which in general have higher strain points. Consequently, glasses of this invention, although showing a propensity for more quickly developing a compressive stress, show an opposing tendency to release that stress as the ion-exchange times are prolonged at higher ion-exchange temperatures. However, this is not at all a detriment and only means that when conducting an ion exchange with the glasses of this invention at higher ion-exchange temperatures, care should be taken that once the maximum compressive stresses develop, the glass should be removed from the ion-exchange bath before the stress starts to relieve itself.

Although the glasses of the invention have a desirable combination of physical properties which allow high production rates, the glasses are of commercially acceptable quality, being on par with commercially available sheet and float glass. One of the most important criteria of glass quality is its chemical durability, particularly its resistance to moisture. As the experiments presented in Example XX below show, the chemical durability of the glasses of this invention, as determined by weight loss in water, dilute acid, dilute caustic and cyclic humidity, are as good as commercially available sheet and float glass.

EXAMPLE XX

In this weight loss test, samples of flat glass are weighed before and after soaking in a particular solution at 100°C. for a half hour. The dimensions of the samples are carefully measured in order to express weight loss in terms of the surface area exposed to the solvent. Table V compares experimental compositions with commercial sheet and float glass.

Table V

Weight Loss Tests

| Sample | Weight Loss in 0.05% $H_2SO_4$ milligrams/ square centimeters/ hours (mg/cm²/hr) | Weight Loss in Water (mg/cm²/hr) | Weight Loss in 0.1 N NaOH (mg/cm²/hr) |
|---|---|---|---|
| Commercial Sheet | 0.02 | 0.03 | 0.16 |
| Commercial Float | 0.02 | 0.02 | 0.21 |
| Glass of Example III | 0.02 | 0.01 | 0.18 |
| Glass of Example IV | 0.02 | 0.07 | |
| Glass of Example V | 0.02 | 0.01 | |
| Glass of Example VI | 0.01 | 0.05 | |

It is believed that the weight loss in water and acid should be less than 0.10 mg/cm²/hr to be commercially acceptable. It has been found that these tests are reproducible to ± 0.02 mg/cm²/hr. In the cyclic humidity tests, samples of flat glass are carefully cleaned with water and alcohol and percent transmittance and haze determined with a Gardner Automatic Pivotable Sphere Hazemeter with an Illuminant "A" filter. The samples are then stored in a chamber at 100 percent humidity and the temperature cycled 90°F. and 140°F. at 90 minute intervals. At the end of 15 days samples are washed and re-examined as described above. Results for commercial float, sheet and the glass of Example I are as follows:

Table VI

| Sample | Before Exposure | | After 15 day Exposure | |
|---|---|---|---|---|
| | % Transmittance | Haze | % Transmittance | Haze |
| Commercial Sheet | 89.0 | 0.11 | 90.3 | 2.10 |
| Commercial Sheet | 88.9 | 0.11 | 90.5 | 2.01 |
| Commercial Sheet | 88.9 | 0.11 | 90.5 | 2.03 |
| Commercial Float | 88.7 | 0.11 | 89.4 | 2.19 |
| Commercial Float | 88.7 | 0.12 | 89.3 | 2.23 |
| Commercial Float | 88.8 | 0.12 | 89.4 | 2.17 |
| Glass of Example I | 89.1 | 0.10 | 89.1 | 1.23 |
| Glass of Example I | 89.2 | 0.10 | 89.2 | 1.18 |
| Glass of Example I | 89.2 | 0.10 | 89.2 | 1.19 |

It is seen that the glass of Example I performs as well or better than commercial products in this test.

Examples XXI to XXVI

To show the propensity of the glasses of this invention for retaining a higher percentage of the added salt cake in the glass rather than emitting it to the atmosphere, the following experiments were conducted:

Six glass compositions were prepared on a laboratory scale. The compositions were made by melting for 20 hours at 1,400°C. in Lavasil crucibles the following well-mixed batch ingredients.

Glasses of the invention were made from melts XXI to XXIV. Melts XXV and XXVI were glasses of the prior art, being conventional float and sheet glass compositions, respectively.

| Ingredients | Parts by Weight in Grams | | | | | |
|---|---|---|---|---|---|---|
| | XXI | XXII | XXIII | XXIV | XXV | XXVI |
| Glass sand | 500 | 500 | 500 | 500 | 500 | 500 |
| Soda ash | 210 | 235 | 190 | 185 | 150.5 | 146 |
| Limestone | 15 | 20 | 17.5 | 12.5 | 39 | 38 |
| Dolomite | 155 | 150 | 133.5 | 122.5 | 125 | 117.5 |
| Aplite | 22 | 20 | 30.7 | 38 | — | 32.5 |
| Rouge | 0.25 | 0.25 | 0.25 | 0.25 | 0.25 | 0.25 |
| Carbon | 0.2 | 0.2 | 0.2 | 0.4 | 0.6 | 0.6 |
| Salt Cake | 5 | 5 | 5 | 10 | 15 | 15 |
| Parts of salt cake per 1000 parts of sand | 10 | 10 | 10 | 20 | 30 | 30 |
| Percent by weight $SO_3$ in batch | 0.38 | 0.38 | 0.39 | 0.78 | 1.23 | 1.18 |

The salt cake requirement in the above melts was based on the optimum melting rates of each of the glasses. Each glass was melted using 0 through 50 parts by weight of salt cake per 1,000 parts by weight of sand in 10 parts by weight increments. The fastest melting rate for each of these glasses determined the salt cake requirement.

The analyzed glass compositions of the above melts were as follows:

| Component | Percent by Weight on the Oxide Basis | | | | | |
|---|---|---|---|---|---|---|
| | XXI | XXII | XXIII | XXIV | XXV | XXVI |
| $SiO_2$ | 71.33 | 70.40 | 72.31 | 72.73 | 73.47 | 73.75 |
| $Na_2O$ | 16.56 | 18.65 | 15.73 | 15.73 | 13.43 | 13.00 |
| $K_2O$ | 0.11 | 0.10 | 0.15 | 0.17 | 0.02 | 0.16 |
| CaO | 6.92 | 6.40 | 6.73 | 6.26 | 8.45 | 7.92 |
| MgO | 4.01 | 3.45 | 3.75 | 3.51 | 3.96 | 3.61 |
| $Al_2O_3$ | 0.77 | 0.70 | 1.03 | 1.25 | 0.12 | 1.14 |
| $Fe_2O_3$ | 0.076 | 0.076 | 0.082 | 0.079 | 0.077 | 0.081 |
| $SO_3$ | 0.31 | 0.36 | 0.32 | 0.46 | 0.50 | 0.46 |
| Total | 100.106 | 100.136 | 100.112 | 100.199 | 100.027 | 100.121 |

The $Na_2O/CaO$ and $CaO/MgO$ weight ratios are as follows:

| | XXI | XXII | XXIII | XXIV | XXV | XXVI |
|---|---|---|---|---|---|---|
| $Na_2O/CaO$ | 2.39 | 2.92 | 2.34 | 2.51 | 1.59 | 1.64 |
| $CaO/MgO$ | 1.72 | 1.86 | 1.71 | 1.80 | 2.12 | 2.19 |

Based on the weight percent of sulfate retained in the above compositions, the amount of salt cake contributing to air pollution is seen in the following table.

| | XXI | XXII | XXIII | XXIV | XXV | XXVI |
|---|---|---|---|---|---|---|
| $SO_3$ in batch (% by weight) | 0.38 | 0.38 | 0.39 | 0.78 | 1.23 | 1.18 |
| $SO_3$ retained in glass (% by weight) | 0.31 | 0.36 | 0.32 | 0.46 | 0.50 | 0.46 |
| $SO_3$ emitted (% by weight) | 0.07 | 0.02 | 0.07 | 0.32 | 0.73 | 0.72 |
| % $SO_3$ retained in glass | 81.6 | 94.7 | 82.1 | 59.0 | 40.7 | 39.0 |
| % $SO_3$ emitted | 18.4 | 5.3 | 17.9 | 41.0 | 59.3 | 61.0 |

We claim:

1. An improved process of manufacturing flat glass by a sheet drawing or float process at higher throughputs and yields than normally associated with these processes, the improvement wherein the glass which is manufactured contains the following composition:

| Component | Percent by Weight on the Oxide Basis |
|---|---|
| $SiO_2$ | 70 –73.3 |
| $Na_2O$ | 15.5 –19.0 |
| CaO | 5.5 – 7.7 |
| MgO | 3.5 – 4.9 |
| $Al_2O_3$ | 0.1 – 1.5 |
| $Fe_2O_3$ | 0.03– 0.7 |
| $K_2O$ | 0.0 – 0.5 |
| $SO_3$ | 0.2 – 0.5 | wherein
a. the percentages of $SiO_2$, $Na_2O$, CaO, MgO, $Al_2O_3$, $Fe_2O_3$ and $SO_3$ amount to at least 98 percent by weight of the total composition, and
b. the CaO/MgO weight ratio is controlled within the range of 1.3 to 1.9, and the $Na_2O/CaO$ weight ratio is controlled within the range of 2.0 to 3.2.

2. The improved process of claim 1, in which 0.3 grams of the glass at a temperature of 2,525°F. will reduce the diameter of a spherical sand grain from 600 microns to less than 360 microns in one hour.

3. The improved process of claim 1 in which the flat glass is manufactured by the Pittsburgh Process.

4. The improved process of claim 1 in which the glass has a melting temperature within the range of 2,550°F. to 2,660°F.

5. The improved process of claim 1 in which the glass has a liquidus temperature within the range of 1,680°F. to 1,725°F.

6. The improved process of claim 5 in which the glass has a working range of 95°F. to 195°F.

7. The improved process of claim 1 in which the glass has a softening point below 1,330°F.

8. The improved process of claim 1 in which the flat glass is manufactured by the Pittsburgh Process and the glass has the following composition:

| Component | Percent by Weight on the Oxide Basis |
|---|---|
| $SiO_2$ | 71 –73.3 |
| $Na_2O$ | 15.5 –16.5 |
| CaO | 5.5 – 6.5 |
| MgO | 3.5 – 4.5 |
| $Al_2O_3$ | 0.7 – 1.5 |
| $Fe_2O_3$ | 0.05– 0.3 |
| $K_2O$ | 0.0 – 0.5 |
| $SO_3$ | 0.2 – 0.5 |

9. In a method of melting glass batch ingredients and forming flat glass in which salt cake is added to the glass batch ingredients for the purposes of dissolving silica scum which forms on the surface of the melt, the improvement comprising:
a. adding less than 25 pounds of salt cake per 1,000 pounds of sand to the batch ingredients,
b. melting the batch ingredients, thereafter cooling and forming the melt to form flat glass having the following composition:

| Component | Percent by Weight on an Oxide Basis |
|---|---|
| $SiO_2$ | 70 – 73.3 |
| $Na_2O$ | 15.5 – 19.0 |
| CaO | 5.5 – 7.7 |
| MgO | 3.5 – 4.9 |
| $Al_2O_3$ | 0.1 – 1.5 |
| $Fe_2O_3$ | 0.03 – 0.7 |
| $K_2O$ | 0.0 – 0.5 |
| $SO_3$ | 0.2 – 0.5 | wherein at least 60 percent of the $SO_3$ which is added to the glass in the form of salt cake and cullet is retained in the flat glass.

10. The method of claim 9 in which at least 80 percent of the $SO_3$ added to the glass batch ingredients in the form of cullet and salt cake is retained in the flat glass article.

11. A flat glass article having the following composition:

| Component | Percent by Weight on the Oxide Basis |
|---|---|
| $SiO_2$ | 70 – 73.3 |
| $Na_2O$ | 15.5 – 19.0 |
| CaO | 5.5 – 7.7 |
| MgO | 3.5 – 4.9 |
| $Al_2O_3$ | 0.1 – 1.5 |
| $Fe_2O_3$ | 0.03 – 0.7 |
| $K_2O$ | 0.0 – 0.5 |
| $SO_3$ | 0.2 – 0.5 | wherein
 a. the percentages of $SiO_2$, $Na_2O$, CaO, MgO, $Al_2O_3$, $Fe_2O_3$ and $SO_3$ amount to at least 98 percent by weight of the total composition, and
 b. the CaO/MgO weight ratio is within the range of 1.3 to 1.9 and the $Na_2O$/CaO weight ratio is within the range of 2.0 to 3.2.

12. The flat glass article of claim 11 produced by the Pittsburgh sheet drawing process.

13. The flat glass article of claim 11 produced by the Float Process.

14. A thermally tempered flat glass article as described in claim 11 which can be thermally tempered more quickly than conventional sheet glass made by the Pittsburgh Process.

15. A welded double glazed unit prepared with the flat glass of claim 11 which can be made with a shorter weld time than conventional sheet glass made by the Pittsburgh Process.

16. A chemically tempered flat glass article as described in claim 11 which can be chemically tempered at a faster rate than conventional sheet glass made by the Pittsburgh Process.

17. The flat glass article of claim 11 which has an increased propensity for chemical strengthening such that when a 0.090 inch thick sheet glass sample is immersed in a molten potassium nitrate bath at 800°F. for 16 hours and then cooled to room temperature, the following stresses are developed:
 a. center tension — greater than 345 millimicrons per inch,
 b. abraded modulus of rupture — greater than 35,000 pounds per square inch,
 c. thickness of compressive layer — greater than 25 microns.

18. The flat glass article of claim 11 which has a Young's Modulus below $10.0 \times 10^6$ pounds per square inch.

* * * * *

UNITED STATES PATENT OFFICE
CERTIFICATE OF CORRECTION

Patent No. 3,833,388     Dated  September 3, 1974

Inventor(s)  Stanley M. Ohlberg and James V. Jones

It is certified that error appears in the above-identified patent and that said Letters Patent are hereby corrected as shown below:

Column 3, line 59, "7.3" should be —73.3—.

Signed and sealed this 3rd day of December 1974.

(SEAL)
Attest:

McCOY M. GIBSON JR.
Attesting Officer

C. MARSHALL DANN
Commissioner of Patents